United States Patent [19]
Buono

[11] Patent Number: 5,949,222
[45] Date of Patent: Sep. 7, 1999

[54] SELF-OSCILLATING SWITCH MODE DC TO DC CONVERSION WITH CURRENT SWITCHING THRESHOLD HYSTERSIS

[76] Inventor: Robert N. Buono, 2049 Charles Ct., Mahwah, N.J. 07430

[21] Appl. No.: 08/986,978

[22] Filed: Dec. 8, 1997

[51] Int. Cl.⁶ .................................................. G05F 1/613
[52] U.S. Cl. ........................................ 323/222; 323/284
[58] Field of Search .................................. 323/222, 282, 323/284, 299

[56] References Cited

U.S. PATENT DOCUMENTS

| | | | |
|---|---|---|---|
| 3,435,320 | 3/1969 | Lee et al. | 321/2 |
| 4,008,429 | 2/1977 | Phalan | 323/284 |
| 4,242,629 | 12/1980 | Shuey | 323/282 |
| 4,456,872 | 6/1984 | Foreschle | 323/286 |
| 4,862,013 | 8/1989 | Konopka | 307/284 |
| 4,961,006 | 10/1990 | Pace et al. | 323/222 |
| 5,341,085 | 8/1994 | Ettes | 323/222 |
| 5,389,871 | 2/1995 | Otake | 323/282 |
| 5,825,163 | 10/1998 | Pontarollo | 323/222 |

OTHER PUBLICATIONS

Levin et al., "Designing With Hysteretic Current–Mode Control", EDN–Design Feature, Apr. 28, 1994, pp. 95–101.
Mammano, "Protect Your Switchers With Digital Current Limiting", Silicon General Linear Integrated Circuits, Application Notes—SG1549, pp. 297–300 Dec. 1997.

*Primary Examiner*—Jeffrey Sterrett
*Attorney, Agent, or Firm*—Law Offices of Peter H. Priest

[57] ABSTRACT

A simple, self-oscillating, DC-to-DC converter current source, using a small number of simple components, with hysteresis around the current switching thresholds. Slight design modifications allow operation in any of several topologies. In another aspect of the invention, operation as a regulated DC-to-DC converter voltage source is achieved through the addition of a small number of additional components, with slight design modifications allowing operation in any of several topologies.

9 Claims, 6 Drawing Sheets

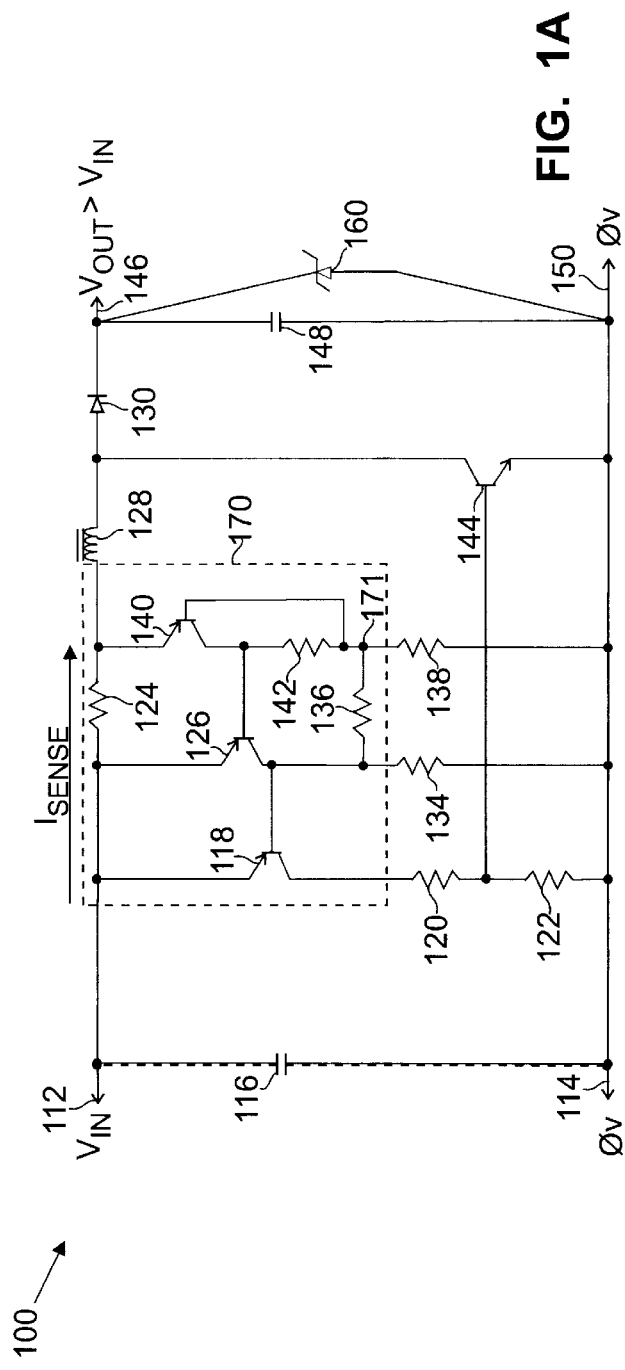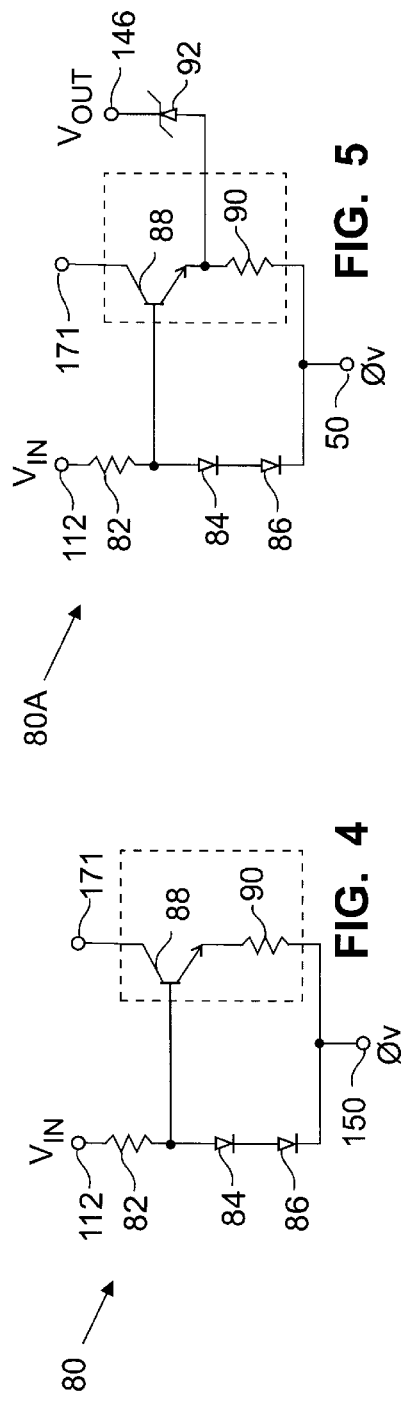

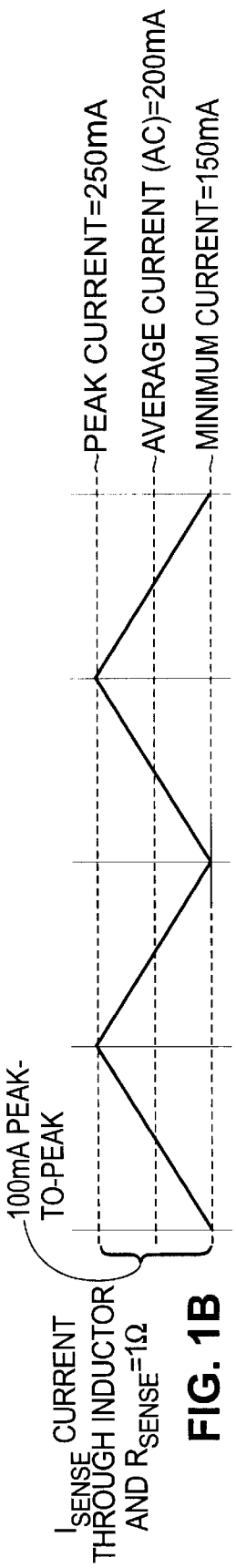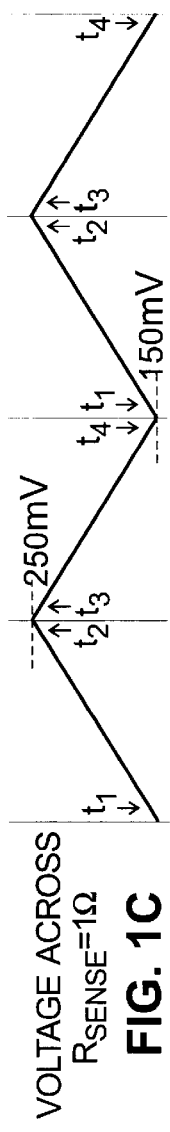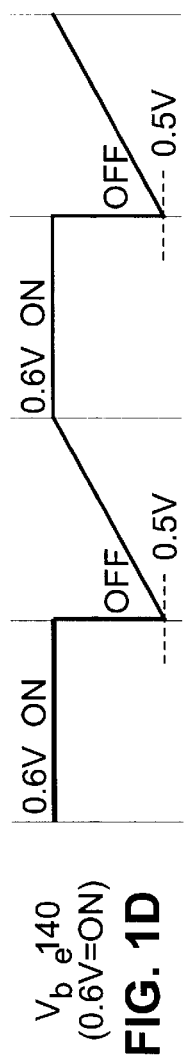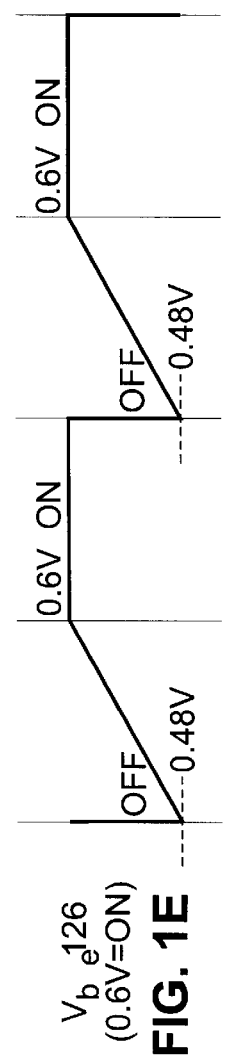

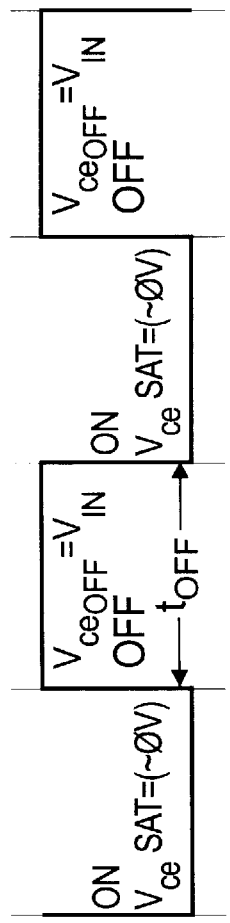
FIG. 1F $V_{ce}$ 118 (DRIVER)
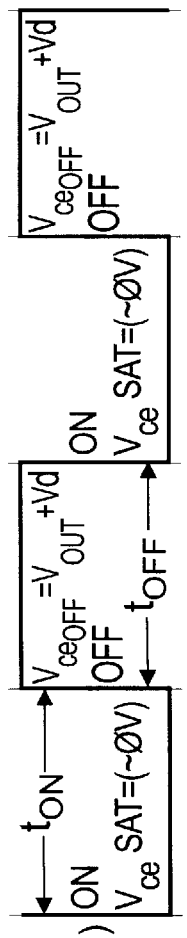
FIG. 1G $V_{ce}$ 144 (POWER SWITCH)
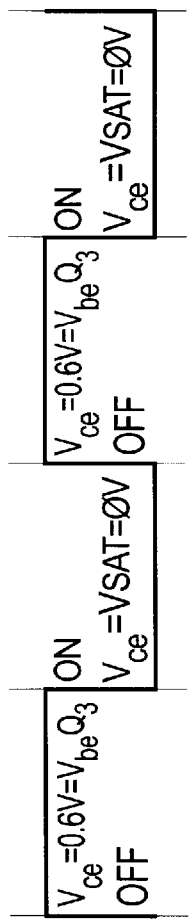
FIG. 1H $V_{ce}$ 126
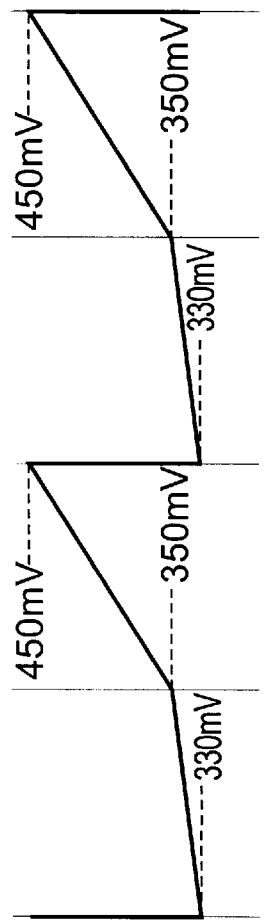
FIG. 1I $V_{ce}$ 140

SELF-OSCILLATING SWITCH MODE DC TO DC CONVERSION WITH CURRENT SWITCHING THRESHOLD HYSTERSIS

FIELD OF THE INVENTION

The present invention relates generally to power supplies for electric and electronic circuits. More particularly, the invention relates to a self-oscillating, switch-mode, DC to DC converter for implementation of hysteretic current-mode control.

BACKGROUND OF THE INVENTION

As disclosed in Froeschle U.S. Pat. No. 4,456,872, hysteretic current-mode control offers significant advantages for many applications. Hysteretic current-mode control offers the tightest and most accurate control of inductor current, is unconditionally stable regardless of duty cycle, and offers excellent transient response to step loads. It is also inherently load-current limiting. Other advantages include short-circuit-proof operation in buck-derived topologies, easy loop-stability design, absence of subharmonic oscillation, instantaneous peak-to-average inductor-current ratio, and the absence of a need for slope compensation for duty cycles above 50%.

Although hysteretic current-mode control offers many advantages, it has not yet achieved the widespread use which might be anticipated given the advantages it offers. This may be due to the fact that most hysteretic current-mode control circuits of the present state of the art are complex, requiring numerous components, with an accompanying significant cost disadvantage with respect to simpler, non-hysteretic arrangements. A hysteretic current-mode control circuit requiring fewer and simpler components would naturally be less expensive to design and manufacture, and would make the advantages of this mode of control available in more applications.

The present invention recognizes the need for a circuit for achieving hysteretic current-mode control which can be manufactured using a small number of simple components to form a low cost unit suitable for use in applications such as a low cost battery charger, a regulated voltage source in a battery operated electronic device or any other application requiring a low cost DC-to-DC converter, as more fully described below.

SUMMARY OF THE INVENTION

A DC-to-DC converter circuit according to one aspect of the present invention includes only 4 transistors or switches and operates so as to utilize hysteresis around the current switching thresholds. Such a circuit may be readily implemented in a very low cost integrated circuit ("IC"). A circuit according to one aspect of the present invention operates as a current source in a BOOST topology, with the output voltage, $V_{out}$, greater than, the input voltage, $V_{in}$ with $V_{out}$ and $V_{in}$ having the same polarity. In another aspect, the present invention operates as a current source in a BUCK topology, with $V_{out}$ less than $V_{in}$, with $V_{out}$ and $V_{in}$ having the same polarity. A circuit according to a further aspect of the present invention operates as a current source in an INVERTING topology, with $V_{out}$ opposite in polarity to $V_{in}$, and of any absolute value relative to $V_{in}$. A circuit according to another aspect of the present invention includes additional components and can be operated as a regulated voltage source in any of the aforementioned topologies with or without negative feedback.

Among the advantages of switch mode-designs such as those of the present invention are that they are inherently more efficient than linear-mode designs because the main power switching component is either in one of two states, fully ON (saturated) or fully OFF. In an ideal sense, both of these two states dissipate no power. In other words, the power switch can experience high voltage or high current, but never both simultaneously. Therefore, the potential for high operating efficiency exists. In real-world practically realizable devices, neither of these two states is perfectly achieved, so there is still some power loss. There is also power lost during the actual switching transition time from one state to the other. However, these losses are much less than those in a linear design. A linear design is one in which the ON-state of the power transistor is continuously variable from fully ON to fully OFF. In this mode of operation, it is possible to simultaneously have high levels of current and voltage on the power transistor, and therefore high power dissipation, and low power conversion efficiency.

A more complete understanding of the present invention, as well as further features and advantages of the invention, will be apparent from the following Detailed Description and the accompanying drawings.

BRIEF DESCRIPTION OF THE DRAWINGS

FIG. 1A is a schematic diagram illustrating a DC-to-DC converter current source according to the present invention, configured in a BOOST topology;

FIGS. 1B–1I show exemplary operating currents and voltages for the circuit of FIG. 1A implemented with specific component values and a specific input voltage;

FIG. 4 is a schematic diagram illustrating a current source which, when used in a BOOST topology DC-to-DC converter, achieves current regulation of the converter and sets the maximum power of the converter;

FIG. 5 is a schematic diagram illustrating a current source which, when used in a BOOST topology DC-to-DC converter, achieves output voltage regulation of the converter and sets the maximum power of the converter, as well as, allowing a lower output current than set by the current source illustrated in FIG. 4;

DETAILED DESCRIPTION

Figure 2:
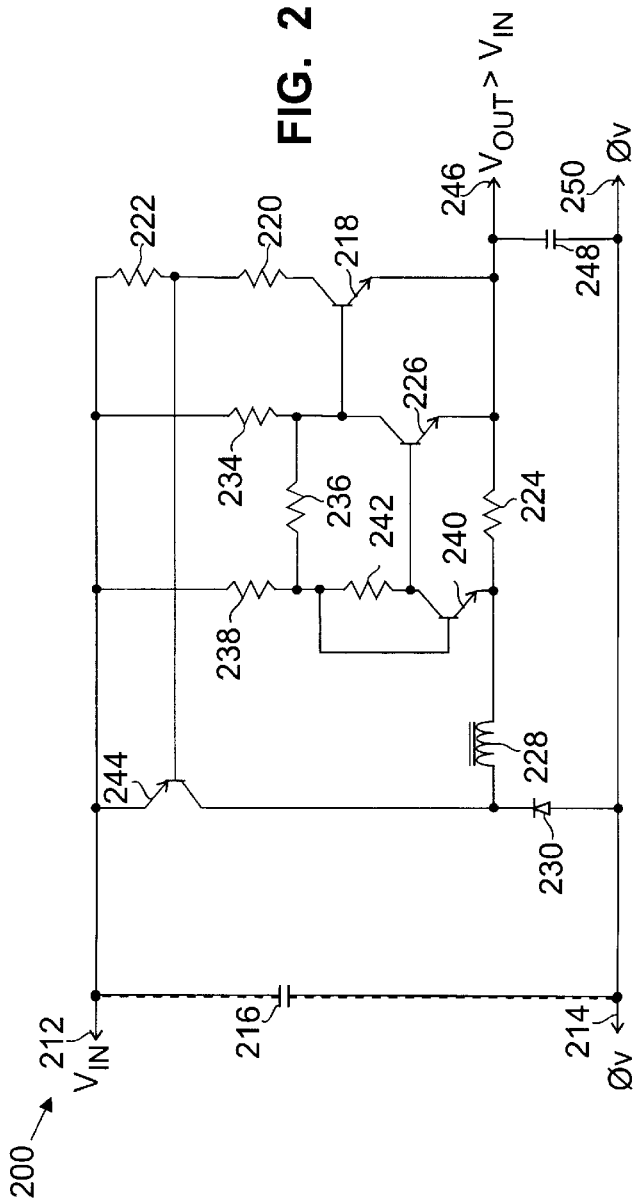
FIG. 2 is a schematic diagram illustrating a DC-to-DC converter current source according to the present invention, configured in a BUCK topology.

FIG. 1A is a schematic diagram illustrating a DC-to-DC converter 100 according to one aspect of the present invention. Converter 100 is configured in a BOOST topology. That is, the output voltage of converter 100 is greater than the input voltage to converter 100. Converter 100 includes first and second input terminals 112 and 114, respectively. A capacitor 116 is connected between the input terminals 112 and 114. In the typical operation of the converter 100, a voltage source is connected to first input terminal 112, while a reference or ground voltage is connected to a second input terminal 114. Terminal 112 is connected to the emitter of a first transistor or third switch 118, and the junction of a first terminal of a resistor 124 and the emitter of a second transistor or second switch 126. The second terminal of the resistor 124 is connected to the junction of a first terminal of an inductor 128 and the emitter of a third transistor or first switch 140. The second terminal of the inductor 128 is connected to the junction of the collector of a fourth transistor or fourth switch 144 and the anode of a diode 130. The cathode of the diode 130 is connected to a first output terminal 146 of converter 100. The first output terminal 146 is connected to a first terminal of a capacitor 148, the second terminal of which is connected to a second output terminal 150 of converter 100. It will be recognized that although the drawing and textual discussion address separate terminals 114 and 150 and separate terminals may be employed, these terminals as drawn are in fact the same electrical node and the DC-to-DC converter can be viewed in its simplest form as a three terminal device with a single input, a single output and a common connection.

Returning to the transistor 118, the collector of transistor 118 is connected to the first terminal of a resistor 120. The second terminal of the resistor 120 is connected to a junction between the base of transistor 144 and the first terminal of resistor 122. The second terminal of the resistor 122 is connected to a junction held at ground or 0 V as are a second terminal of a resistor 134, a second terminal of a resistor 138, the emitter of the transistor 144, the second input terminal of the converter 100 and the second output terminal of the converter 100. Returning again to transistor 118, the base of transistor 118 is connected to a junction between the collector of transistor 126, a first terminal of a resistor 136, and the first terminal of the resistor 134. The base of transistor 126 is connected to a junction between the collector of transistor 140 and a first terminal of a resistor 142. The base of transistor 140 is connected to a junction between the second terminal of resistor 142, the second terminal of resistor 136, and the first terminal of resistor 138. The components 118, 124, 126, 136, 140 and 142 define a current sensing circuit and switching comparator with hysteresis 170. Control terminal 171 sets the current levels at which switching occurs.

The operation of the converter 100 is generally as follows. Transistor 140 switches ON and OFF depending on the voltage across the current-sensing or sense resistor 124. When transistor 140 is ON, it conducts an essentially constant current determined by $V_{in}$ and resistor 138. Transistor 126 operates as a saturated switch, and is either fully ON (saturated) or fully OFF, and alternates between these two states, depending on the current flow through, and therefore the voltage drop across the resistor 124.

Transistors 140 and 126 operate with opposite phasing. Transistors 118 and 144 operate in essentially the same way as transistor 126, but with opposite phasing. When transistor 144 is ON, current ramps up or increases in inductor 128, resistor 124 and transistor 144. When transistor 144 is OFF, current ramps down or decreases in inductor 128 and resistors 24, and flows through diode 130 to the output of converter 100, at a voltage higher than the input voltage. A current passes through resistor 138, which is equal to the voltage across resistor 138 ($V_{in}$ minus the $V_{be}$ of transistor 140 plus the small voltage drop across resistor 124 which will be approximately 100–200 mV), divided by the value of resistor 138.

This current also flows through resistor 142, and causes the voltage at the base of transistor 126 to be higher than the voltage at the base of transistor 140, by an amount equal to the voltage across resistor 142. This causes transistor 126 to be biased OFF. If the current flowing through resistors 138 and 142 is essentially constant, and proportional to $V_{in}$, it will require a voltage drop across resistor 124, equal to the voltage drop across resistor 142, in order to cause transistor 126 to turn on. Since transistor 126 is OFF, transistors 118 and 144 will be ON.

Further, the current will be increasing in inductor 128 and resistor 124. When the voltage drop across resistor 124 just exceeds the voltage drop across resistor 142, transistor 126 will turn ON, and therefore transistors 118 and 144 will turn OFF. With transistor 144 OFF, the current through inductor 128 will decrease. When the voltage drop across resistor 124 is just less than the voltage drop across resistor 142, transistor 126 will again turn OFF, causing transistors 118 and 144 to turn ON. The cycle then repeats. Resistor 136 serves the important role of adding hysteresis or positive feedback to the voltage level seen at the base of transistor 126, thereby allowing clean switching without spurious oscillations around the turn-on threshold of transistor 126.

This hysteresis defines the turn-on and turn-off switching voltages of the second switch, the transistor 126. The amount of hysteresis is very well controlled, because the voltage level at the collector of transistor 126 is clamped in both the ON and the OFF state of operation of transistor 126. When transistor 126 is ON, it is saturated, and the voltage at the collector of transistor 126 is essentially $V_{in}$. When transistor 126 is OFF, the voltage at the collector of transistor 126 is clamped by transistor 118 to a level equal to $V_{in}$ minus the $V_{be}$ of transistor 118. Thus, the current switching thresholds of the circuit, are well defined and controllable by selecting the circuit values of the resistors 124, 142, 138 and 136. Depending upon the application, the resistor 138 might be a variable resistor which could be varied manually or automatically varied subject to processor control.

In the circuit shown in FIG. 1, there is a current threshold dependency on $V_{in}$. However, it is a simple matter to replace the resistor 138 with a constant current source, thereby rendering the switching current thresholds independent of $V_{in}$ and solely a function of the values of resistors 124, 142 and 136, and the current source. The necessary additional components are shown in FIG. 4 and will be discussed in further detail below.

For the BOOST converter, the OUTPUT current may be calculated from the parameters $V_{in}$, $V_{out}$, $I_{in}$ and the efficiency of the converter. $V_{out}$ has a wide compliance. That is, it can assume any value, but it must be greater than $V_{in}$ and have the same polarity. It can be seen that converter 100 is very simple in the sense that it has few connections, it has a very low part count, and can be very inexpensively constructed. It will be noted that the bulk of the components can be readily fabricated as a part of an integrated circuit (IC) or as a stand alone integrated circuit requiring only a very few external connections to connect to components such as an inductor or capacitors which are not readily or desirably fabricated on an IC.

FIGS. 1A–1I show exemplary operating currents and voltages for the circuit of FIG. 1A implemented with the resistor 138 replaced with a 3 mA constant current source and with the exemplary voltage and component values shown in the table below:

$V_{in}$ 5 V DC
Capacitor 116 100 μF
Capacitor 148 100 μF
Transistor switch 118 ($Q_3$) 2N3906

Transistor switch 126 ($Q_2$) 2N3906

Transistor switch 140 ($Q_1$) 2N3906

Transistor switch 144 ($Q_4$) ZTX690B

Resistor 120 330Ω

Resistor 122 100Ω

Resistor 124 ($R_{sense}$) 1Ω

Resistor 134 2000Ω

Resistor 136 500Ω

Resistor 142 100Ω

Inductor 128 1 mH

Diode 130 1N5817

In FIGS. 1A–1I, at time, $t_1$, the transistor 144 is ON and the current, $I_{sense}$, through sense resistor 124 is ramping up. This current is substantially equal to the current through inductor 128 as the current through the transistor 140 is small with respect to $I_{sense}$. At time, $t_2$, the transistor 144 is ON and the current $I_{sense}$ is about to reach its peak just before transistor 126 turns ON. At time, $t_3$, the transistor 144 is OFF and the current $I_{sense}$ is ramping down. Finally, at time, $t_4$, the transistor 144 is OFF with the current $I_{sense}$ about to reach its minimum just before the transistor 140 turns ON.

FIG. 2 is a schematic illustrating a DC-to-DC converter 200 according to another aspect of the present invention. The converter 200 is configured in a BUCK topology. That is, the output voltage of converter 200 is less than the input voltage. Converter 200 can be made of components identical to those used in converter 100, with the difference consisting in the arrangement of components. Therefore, the reference numerals used for the components of converter 200 are similar to those used for the components of converter 100. It will be recognized that a manufacturing line can advantageously be set up to make two or more different converters from essentially the same parts.

Converter 200 includes first and second input terminals 212 and 214, respectively, with a capacitor 216 connected between them. An input $V_{in}$ is provided to first input terminal 212, and second input terminal 214 is connected to a reference voltage which will usually be ground. Converter 200 also includes first and second output terminals 246 and 250, respectively, with a capacitor 248 connected between the output terminals 246 and 250. First output terminal 246 produces an output voltage $V_{out}$, and second output terminal is connected to a reference voltage which is the same as the reference voltage connected to input terminal 214 and which as noted above will usually be ground. First input terminal 212 is connected to an emitter of the transistor 244, the first terminal of a resistor 238, the first terminal of the resistor 234 and the first terminal of the resistor 222. The base of the transistor 244 is connected to the junction between the second terminal of resistor 222 and the first terminal of the resistor 220. The collector of transistor 244 is connected to the junction between the first terminal of the inductor 228 and the cathode of diode 230. The second terminal of the resistor 238 is connected to the junction between the first terminal of the resistor 236, the first terminal of the resistor 242 and the base of transistor 240. The collector of the transistor 240 is connected to the junction between the second terminal of the resistor 242 and the base of transistor 226, and the emitter of the transistor 240 is connected to a junction between the second terminal of the inductor 228 and the first input of the resistor 224.

The collector of transistor 226 is connected to the junction between the second terminal of the resistor 234, the second terminal of the resistor 236, and the base of the transistor 218. The emitter of transistor 226 is connected to the junction between the second terminal of the resistor 224, the emitter of the transistor 218, and the first output terminal 246 of converter 200. The second output terminal 250 is connected, as previously described, to capacitor 248, and also to the anode of diode 230 and second input terminal 214.

Returning now to transistor 218, the collector of transistor 218 is connected to the second terminal of resistor 220. The same functionality applies to the operation of converter 200 as to converter 100, but it should be noted that in the topology illustrated in FIG. 2, an output voltage $V_{out}$ will be produced which is less than $V_{in}$ and of the same polarity.

Figure 3:
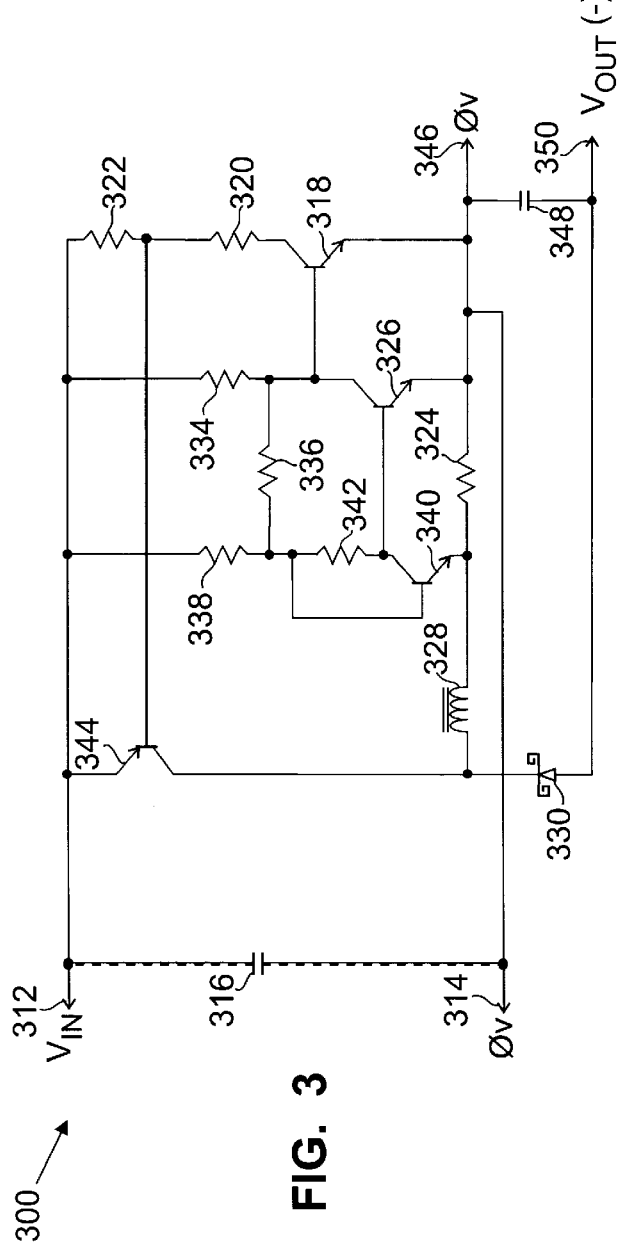
FIG. 3 is a schematic diagram illustrating a DC-to-DC converter current source according to the present invention, configured in an INVERTING topology.

FIG. 3 is a schematic illustrating a DC-to-DC converter 300 according to another aspect of the present invention. The illustrated topology is an INVERTING topology, producing an output voltage $V_{out}$ opposite in polarity to the input voltage $V_{in}$, and of any absolute value relative to $V_{in}$.

Converter 300 can be made of components identical to those used in converter 100, with the difference consisting in the arrangement of components. Therefore, the reference numerals used for the components of converter 300 are similar to those used for the components of converter 100. It will be recognized that a manufacturing line can advantageously be set up to make two or more different converters from essentially the same parts.

Converter 300 includes first and second input terminals 312 and 314, respectively, with capacitor 316 connected between input terminals 312 and 314. The input $V_{in}$ is provided to first input terminal 312, while second input terminal 314 is connected to a reference voltage which will usually be ground. Converter 300 also includes first and second output terminals 346 and 350, respectively, with a capacitor 348 connected between them. First output terminal 346 is connected to the reference voltage, and an output $V_{out}$ is produced at the second output terminal 350.

Input terminal 312 is connected to an emitter of a transistor 344, a first terminal of a resistor 338, a first terminal of a resistor 334 and a first terminal of a resistor 322. The base of the transistor 344 is connected to a junction between the second terminal of resistor 322 and a first terminal of a resistor 320. The collector of the transistor 344 is connected to a junction between a first terminal of an inductor 328 and the cathode of a diode 330. The second terminal of the resistor 338 is connected to a junction between the first terminal of a resistor 336, the first terminal of a resistor 342 and the base of a transistor 340. The collector of the transistor 340 is connected to a junction between the second terminal of the resistor 342 and the base of a transistor 326. The emitter of transistor 340 is connected to a junction between the second terminal of the inductor 328 and the first input of a resistor 324.

The collector of transistor 326 is connected to a junction between the second terminal of the resistor 334, the second terminal of the resistor 336, and the base of a transistor 318. The emitter of transistor 326 is connected to a junction between the second terminal of the resistor 324, the emitter of the transistor 318, the first output terminal 346 of converter 300, and the second input terminal 314 of converter 300. The second output terminal 350 is connected, as previously described, to capacitor 348, and also to the anode of diode 330. Returning now to transistor 318, the collector of transistor 318 is connected to the second terminal of resistor 320.

Figure 6:
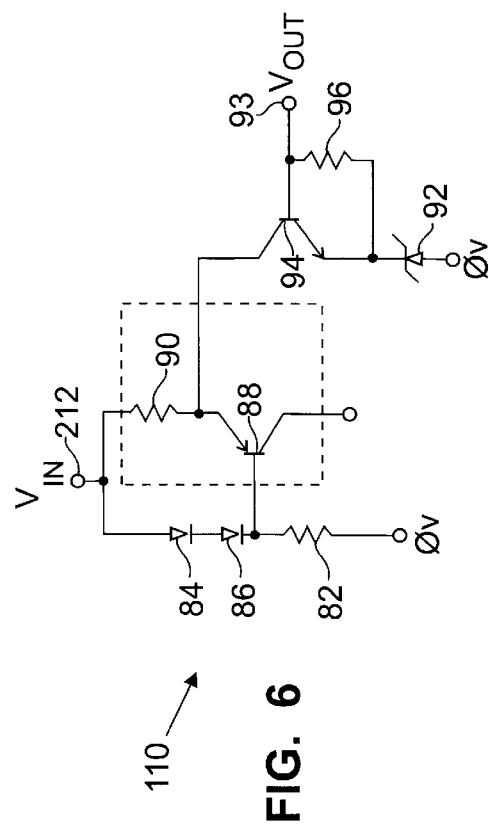
FIG. 6 is a schematic diagram illustrating a current source which, when used in a BUCK topology DC-to-DC converter, achieves voltage regulation of the converter.
Figure 7:
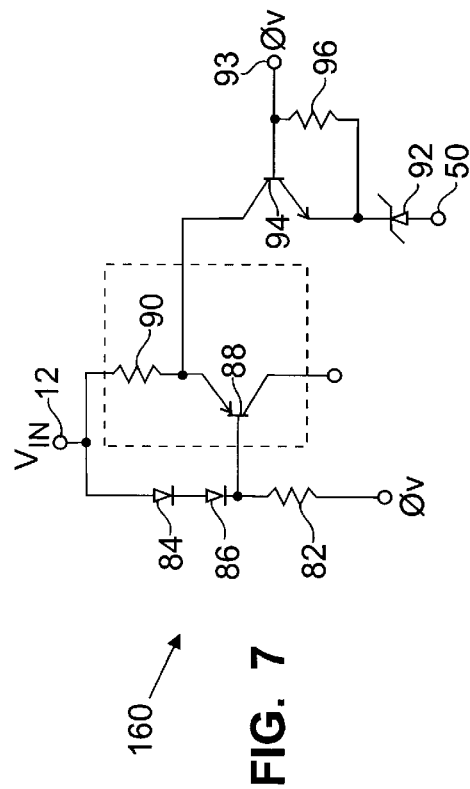
FIG. 7 is a schematic diagram illustrating a current source which, when used in an INVERTING topology DC-to-DC converter, achieves voltage regulation of the converter.

The DC-DC converter circuits when constructed as shown in FIGS. 1–3 are designed to operate with continuous inductor current. This means that there is always a DC component of current present in the inductor. The absolute current flowing in the inductor ramps up and down, as the power switch turns ON and OFF respectively. It is this same current which flows through the resistors 124, 224, 324 of FIGS. 1, 2 and 3 respectively. It is not intended for the current in the inductor to ramp down to 0 A. This restriction on operational current levels can cause problems, particularly if the circuit is to be used as a regulated voltage source DC-DC converter employing negative feedback and this circuit is used in an application that requires the output voltage to remain in regulation even when the attached load will draw little or no current. The invention can be readily adapted to operate under these conditions, as well as maintain nominal operation at higher output current levels, by the addition of a single resistor connected from the base terminal of the transistors 126, 226 and 326 of FIGS. 1, 2 and 3 respectively, to the input reference terminal in the case of FIG. 1, or the input terminal in the case of FIGS. 2 and 3. The addition of this resistor is necessary to allow the transistors 126, 226 and 326 to be able to turn ON, even when the programming current provided by the circuitry of FIGS. 5, 6 and 7 is set to 0 A. This assures that the power switch can always be turned OFF, should the regulated output voltage rise above the regulation limits.

The frequency at which the converter circuits 100, 200 or 300 will switch is dependent on many factors. These include the input and output voltage levels, the switching voltage thresholds and the amount of hysteresis selected via component value selection, as well as the inductance value for the inductor. Those skilled in the art will be able to readily calculate the switching frequency under any set of operating conditions. There is no limit to the range of switching frequencies which may be achieved, except as dictated by the switching characteristics of the selected components. Those skilled in the art will recognize the benefits of switching at higher frequencies. Principal among these benefits is that the physical size, cost and component value of capacitors and inductors generally decrease with increasing operating frequency. This may also be considered another advantage of this invention over the present art, in that the range of operating frequency is virtually unlimited, in contrast to present designs, which incorporate an oscillator "block" with inherent upper and lower limits on operational switching frequency.

As will be discussed in detail in connection with FIGS. 4–7 below, DC-to-DC converters according to the present invention can be used as regulated voltage sources, through the addition of a circuit consisting of a few simple components. As an alternative, the simplest implementation of a regulated voltage source may be achieved by adding a Zener diode 160 shown in FIG. 1A connected across the output terminals 146 and 150. Zener diode 160 will clamp the output voltage in a known fashion. The constant current supplied by the converter will be shared by the Zener diode and the load. A Zener diode could also be added to the converters of FIGS. 2 and 3. Anywhere a Zener diode appears in the drawings, any two or three terminal voltage reference or shunt regulator can be employed. Various examples of suitable devices are TL431, TLV431, LM385, ZR2341 and the like.

FIG. 4 is a schematic illustrating a current source circuit 80 for insertion in converter 100 illustrated in FIG. 1A, for the purpose of modifying the converter 100 so that the current regulated by the converter is independent of the magnitude of $V_{in}$. Current source circuit 80 includes a resistor 82, whose first terminal is preferably connected to the first input terminal 112 of converter 100. The second terminal of resistor 82 is connected to a junction between the base of a transistor 88 and the anode of diode 84. The cathode of diode 84 is connected to the anode of diode 86. The collector of transistor 88 is preferably connected to a node 171 connected to the base of the transistor 140 in converter 100. The emitter of transistor 88 is connected to a first terminal of a resistor 90. The second terminal of the resistor 90 is connected to a junction, usually held at ground, as are the cathode of diode 86 and, preferably, the second output terminal 150 of converter 100.

Current source circuit 80 is preferably inserted into converter 100 in place of the resistor 138. With current source circuit 80 employed in the converter 100, the current switching thresholds are independent of the input voltage into converter 100, and become a function solely of the values of resistors 124, 142 and 136 and the current set by the current source circuit 80.

FIG. 5 illustrates a current source circuit 80A, which is a modification of current source circuit 80. Current source circuit 80A is identical to current source circuit 80, except that an anode of a Zener diode 92 is connected between the emitter of transistor 88 and the first terminal of resistor 90. The cathode of Zener diode 92 forms an output terminal 93 of the current source circuit 80A. The current source circuit 80A is preferably employed in converter 100 as a substitute for resistor 138. Output terminal 93 of current source circuit 80A is preferably connected to output terminal 146 of converter 100. The addition of Zener diode 92 decreases the output power level of current regulator circuit 100 as the output voltage of converter 100 exceeds a level equal to the voltage across Zener diode 92 plus $V_d$. As Zener diode 92 begins to conduct, the current flowing through transistor 88 decreases by the amount flowing through Zener diode 92. Thus, the output voltage can be set and regulated.

When used in converter 100, current source circuit 80A adds negative feedback control to the converter and renders the current through converter 100 a function of the absolute output voltage of converter 100. Voltage regulation is therefore achieved, and converter 100 operates as a true voltage source, or voltage-output DC-to-DC converter power source. The current level is set by $V_d$ (approximately 0.6 VDC) divided by the value of resistor 90. This current level sets the maximum output power level of the converter.

FIG. 6 is a current source circuit 110 suitable for use in the BUCK topology converter 200. Current source circuit 110 includes a diode 84, whose anode is preferably connected to the first input terminal of converter 200. The cathode of the diode 84 is connected to the anode of a diode 86, whose cathode is connected to a junction between the base of a transistor 88 and a first terminal of a resistor 82. The second terminal of resistor 82 is connected to the reference voltage which is usually ground. The emitter of transistor 88 is connected to a junction between a collector of a transistor 94 and the second terminal of a resistor 90, whose first terminal is preferably connected to the first input terminal 212 of converter 200. The collector of transistor 88 is preferably connected to the base of transistor 240 in converter 200.

The base of transistor 94 is connected to a junction between a first terminal of a resistor 96, and, an output terminal 93 of current source circuit 110. The output terminal 93 of current source circuit 110 is preferably connected to output terminal 246 of converter 200. The second terminal of resistor 96 is connected to a junction between the emitter of transistor 94 and the cathode of a Zener diode 92, whose anode is connected to the reference voltage.

The current source circuit 110 is preferably employed in converter 200 in place of resistor 238. Transistor 94 and resistor 96 are employed to permit voltage level shifting by current source circuit 110, and the same principles apply to the use of current source circuit 110 in converter 200 as apply to the use of current source circuit 80A in converter 100. $V_{out}$ will be regulated to an absolute value equal to $V_{ZD1}$ which is the voltage across Zener diode 92 plus $V_d$ (or $V_{be}$ of transistor 94). $V_d$ essentially equals $V_{be}$=0.6 VDC.

FIG. 7 is a schematic diagram illustrating a current source circuit 160 for use in INVERTING topology converter 300. Current source circuit 160 is identical to current source circuit 110, except that output terminal 93 is connected to the reference voltage and the anode of Zener diode 92 is preferably connected to the output terminal 350 of converter 300. Again, $V_{out}$ will be regulated to an absolute value equal to $V_{ZD1}$ plus $V_d$ (or $V_{be}$ of transistor 94). $V_d$ essentially equals $V_{be}$=0.6 VDC.

Figure 8A:
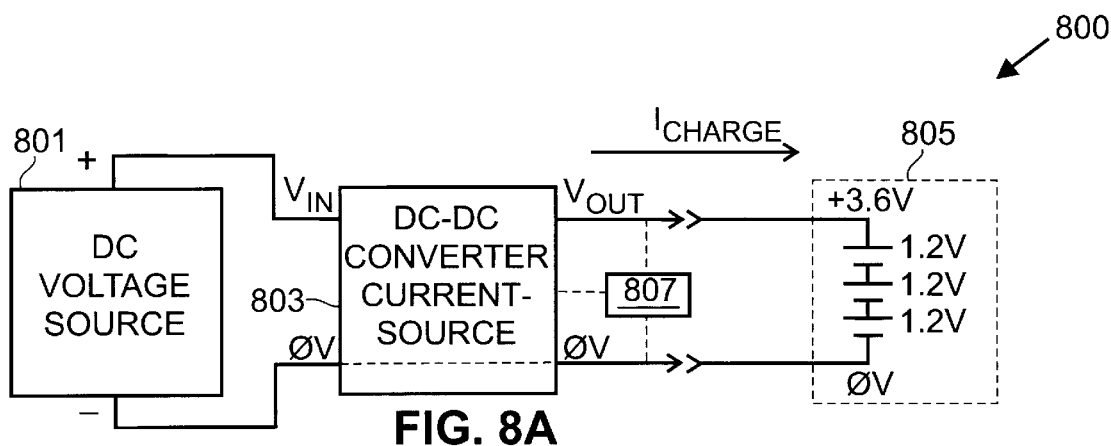
FIGS. 8A–8C illustrate various applications of converters in accordance with the present invention.
Figure 8B:
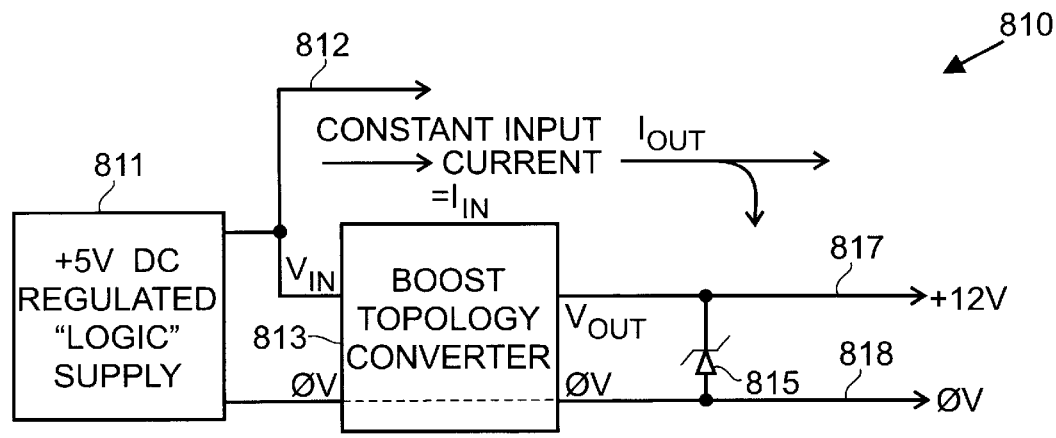
Figure 8C:
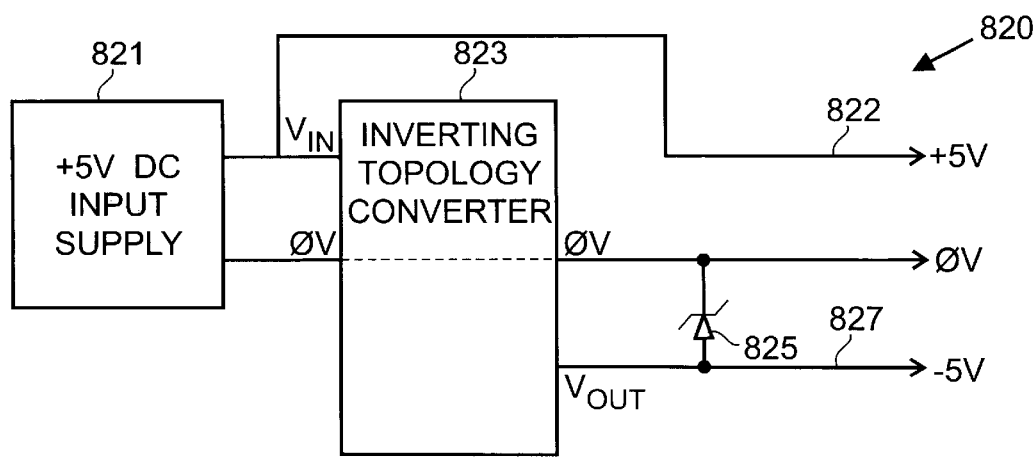

FIGS. 8A–8C illustrate several exemplary advantageous applications of converters in accordance with the present invention. FIG. 8A illustrates a simple battery charging circuit 800 in which a source of DC voltage 801 greater than the voltage of the battery or batteries to be charged is supplied to a buck topology converter 803 which may suitably be constructed as shown for the converter 200 of FIG. 2. The output voltage from the converter is supplied to a battery or battery stack 805. As shown in FIG. 8A, the battery stack 805 comprises three nickel-cadmium (NiCd) 1.2 volt (V) batteries so that the source 801 must supply a voltage greater than 3.6 V. The source 801 may suitably be either a regulated or an unregulated source. An optional shunt regulator 807 may be employed for providing more precise output voltage regulation with or without negative feedback. The current output from converter 803 is a substantially constant charging current $I_{charge}$. Thus, a very simple and inexpensive battery charger can be constructed utilizing the teachings of the present invention.

FIG. 8B illustrates a step up voltage supply 810 in which a 5 V DC regulated logic supply 811 is connected by a line 812 to provide +5 V DC to logic circuits and the like requiring a regulated supply of 5 V DC. The supply 810 is also connected to a boost topology converter 813 which may suitably be constructed like the converter 100 of FIG. 1 A. A 12 V Zener diode 815 is connected across the outputs of the converter 813. The supply 810 provides on output lines 817 and 818 a 12 V supply which may suitably supply local analog or other circuits requiring a 12 V supply. It will be recognized that $V_{in}$ could just as well be, 3 V provided by a 3 V lithium battery, 3.3 V, or 3.6 provided by a NiCd battery stack or any other desired input voltage so long as $V_{in}<V_{out}$. A constant output current, $I_{out}=I_{in}(V_{in}/V_{out})$ is provided by the supply 810.

FIG. 8C illustrates a bipolar power supply 820 formed in accordance with the present invention. In FIG. 8C, a 5 V DC input supply 821 is connected to an inverting topology converter 823 which may suitably be constructed like the converter 300 shown in FIG. 3. The supply 821 is also connected by way of a connection 822 to load circuits requiring +5 V DC. One output of the converter 823 is connected to a 5.1 V Zener diode 825. The second output provides a –5 V DC supply on a supply line 827 to load circuits requiring that supply voltage. Thus, it is seen that a bipolar power supply 820 is readily derived utilizing a single positive-only source 821. While a 5 V DC source 821 is shown, higher or lower voltages such as 12 V or 3.6 V could also suitably be employed. With the correct selection of components, voltages as low as 0.8 V could be employed.

While the present invention is disclosed in the context of a presently preferred embodiment, it will be recognized that a wide variety of implementations may be employed by persons of ordinary skill in the art consistent with the above discussion and the claims which follow below. As addressed above, the present invention provides a low-component-count, self-oscillating, switch-mode, DC to DC converter. It can be powered from a wide range of DC input voltages, and can produce a wide range of DC output voltages, by simply varying the values of a handful of components. It will be recognized that different resistors or alternatively a variable resistor or resistors may be employed depending upon the application. Importantly, the topology need not change. As several examples of suitable applications, the present invention is readily applicable as part of a low cost, flexible and highly reliable battery charger circuit, a regulated voltage source in any battery operated, portable electronic device where low cost is key, or in any application requiring a low cost DC-to-DC converter.

The present invention is well suited for creating localized sources of voltage on circuit boards where those voltages are not supplied. For example, suppose there is a circuit board designed for a mixed-signal application, that is, it contains both analog and digital circuitry. If the analog circuitry must interface with externally applied signals, the analog circuitry must usually be powered by supply voltages which exceed the magnitude of any applied input signals. If it is desired to power the analog circuitry from +15 V, but the circuit board is 95% populated by digital circuitry running at +5 V, it would not previously have been economically prudent to specify a power supply for the system which delivers both +5 V and +15 V, when the +5 V demand is so much greater than the +15 V demand. The invention as shown in FIG. 8B could be implemented right in the area of the analog circuitry, and produce +15 V using the +5 V as its power source. Further, any voltage, at any level of precision required by this circuitry could be produced by this invention, solely by selecting the correct value and precision of voltage clamping device across the output terminals of the invention.

While there are presently solutions to this commonly encountered problem, these involve DC/DC converter ICs or modules, as well as capacitive voltage doubler or multiplier ICs. The present invention has the advantages of lower cost, the option of operating with or without negative feedback, inherent stability considerations, plus the option of being able to separately chose the accuracy of the output voltage setting device, for example, a shunt regulator or Zener diode. The existing capacitive techniques have the disadvantage that they operate best generating output voltages which are discrete multiples of the input voltage, whereas the invention can produce virtually any voltage required.

The present invention provides a high degree of flexibility. For example, when a Zener diode is added across the output terminals of FIG. 2, that diode sets the output voltage as follows. For example, suppose the component values of FIG. 2 were chosen so that the converter delivers a constant 100 mA to the load. All that is required to set the desired output voltage is to chose an appropriate zener diode. For an output voltage of +5 V, a 5.1 V zener diode would be connected across the output terminals. The constant 100 mA output current of the converter would be shared between the zener diode and the load. In this configuration, the load could demand any current, from 0 mA up to 100 mA, and the output voltage would remain at 5.1 V within the tolerances of the zener diode selected. When the load "needed" 100 mA, the Zener diode would conduct 0 mA, and when the load needed 0 mA, the Zener diode would conduct the full 100 mA output current of the converter.

Further advantages of using the present invention in a shunt-VOLTAGE-regulator topology are the following: 1) The switching frequency of the converter is more constant, as the operating current of the converter does not vary. The switching frequency will still vary however, as a function of the input voltage magnitude. 2) The benefit of inherent output current limiting and short-circuit protection is retained. Although operating efficiency suffers when the load demands less than the full output current of the converter, the efficiency when operating near full load is maximized. Thus, this circuit is best applied where the load circuit is known to draw a relatively constant current. Note shunt regulators fed by linear current sources are known to suffer from low efficiency, however, in this application, the shunt regulator device is fed by a switching-mode current source, and therefore has the high efficiency characteristic of switching-mode operation. 3) By allowing the output voltage clamping or shunt regulating device to be a separate device, the user can choose this device to meet the requirements of the application. For example, if extremely precise voltage regulation is required, a precise shunt voltage reference may be used. The voltage regulation accuracy is then solely a function of the accuracy of the shunt voltage regulator device chosen. If only nominal (5% or 10%) voltage regulation is required, an ordinary inexpensive zener diode may be chosen. Note that the zener diode, or shunt regulator chosen, must be able to handle the full output current of the converter. 4) The advertising literature for various company's switch-mode integrated circuits and their implementations tout ease-of-use and design as a feature. Also, these manufacturers offer simple design software to address users "fear" of designing switch mode circuits. The present invention has the advantage of being extremely simple to implement. In the shunt-regulator mode previously described, there is no negative feedback, and therefore no feedback loop to stabilize. The circuit is inherently stable, and will not oscillate. This should allow wide acceptance of this invention.

Additionally, the present invention is not restricted to non-isolated voltage conversion applications which are defined as applications where both the input and output voltages share the same reference terminal. The converters 100, 200 and 300 may be converted to an isolated design by simply substituting a transformer in place of the inductors 128, 228 and 328, respectively. Again, negative feedback may or may not be added.

Other applications will be apparent to those of ordinary skill in the art in light of the present teachings and claims.

I claim:

1. A self-oscillating switched mode, DC-to-DC converter for receiving an input voltage and producing an output voltage, comprising:

a first switch connected between first and second input terminals through a current sensing element, the first input terminal being connected to an input voltage, the second input terminal being connected to a reference voltage, the first switch being either in an OFF or an ON state and when in its ON state conducting an essentially constant current;

a second switch connected between the first and second input terminals, the second switch alternating between a fully ON and a fully OFF state, the second switch having a turn-on threshold depending on a voltage drop between the first switch and the second switch, the state of the second switch depending on the voltage drop between the first switch and the second switch with respect to the turn-on threshold, the second switch operating opposite in phase to the first switch;

a third switch connected between the first and second input terminals, the third switch operating opposite in phase to the second switch, having a state controlled by the second switch;

a fourth switch connected between the first and second input terminals, the fourth switch operating in phase with the third switch, having a state controlled by the third switch;

current storage and sensing means receiving current from the fourth switch and producing a voltage drop between the first switch and the second switch, the voltage drop depending on the level of stored current, the voltage drop serving to control the state of the second switch; and hysteresis means for controlling the voltage drop between the first switch and the second switch when the voltage drop is near the turn-on threshold of the second switch to thereby control the turn-on threshold of the second switch.

2. The converter of claim 1 wherein the first, second and third switches are connected in parallel between the input voltage and the reference voltage, and the fourth switch is connected in parallel between a first output terminal for producing the output voltage and the reference voltage.

3. The converter of claim 2 wherein each of the switches is a transistor.

4. The converter of claim 3 wherein the ON state of the second through fourth switches is a fully saturated state.

5. The converter of claim 4 wherein the current storage and sensing means is connected between the first input terminal and the first output terminal, the current storage and sensing means being operative to pass current to the first output terminal to produce the output voltage, a diode being further connected between the current storage and sensing means and the first output terminal.

6. The converter of claim 5 wherein the second input terminal is connected to a second output terminal.

7. A self-oscillating switched mode, DC-to-DC converter for receiving an input voltage and producing an output voltage, comprising:

a first transistor connected between first and second input terminals through a current sensing element, the first input terminal being connected to an input voltage, the second input terminal being connected to a reference voltage, the first transistor being either in an OFF or an ON state and when in its ON state conducting an essentially constant current;

a second transistor connected between the first and second input terminals, the second transistor alternating between a fully ON and a fully OFF state, the second transistor having a turn-on threshold depending on a voltage drop between the first transistor and the second transistor, the state of the second transistor depending on the voltage drop between the first transistor and the second transistor with respect to the turn-on threshold, the second transistor operating opposite in phase to the first transistor;

a third transistor connected between the first and second input terminals, the third transistor operating opposite in phase to the second transistor, having a state controlled by the second transistor;

a fourth transistor connected between the first and second input terminals, the fourth transistor operating in phase with the third transistor, having a state controlled by the third transistor;

current storage and sensing means receiving current from the fourth transistor and producing a voltage drop between the first transistor and the second transistor, the voltage drop depending on the level of stored current, the voltage drop serving to control the state of the second transistor;

hysteresis means for controlling the voltage drop between the first transistor and the second transistor when the voltage drop is near the turn-on threshold of the second transistor to thereby control the turn-on threshold of the second transistor;

wherein the first, second and third transistors are connected in parallel between the input voltage and the reference voltage, and the fourth transistor is connected in parallel between a first output terminal for producing the output voltage and the reference voltage;

wherein the ON state of the second through fourth switches is a fully saturated state wherein the current storage and sensing means is connected between the first input terminal and the first output terminal, the current storage and sensing means being operative to pass current to the first output terminal to produce the output voltage, a diode being further connected between the current storage and sensing means and the first output terminal;

wherein the second input terminal is connected to a second output terminal; and further comprising a current source circuit connected between the first input terminal, the second input terminal, and the base of the first transistor, for regulating a constant current input of the converter.

8. The converter of claim 7 further comprising a Zener diode connected between the current source circuit and the first output terminal, for regulating the voltage output of the converter.

9. The converter of claim 7 further comprising a shunt voltage regulator connected between the current source circuit and the first output terminal, for regulating the voltage output of the converter.

* * * * *